Figure 1:
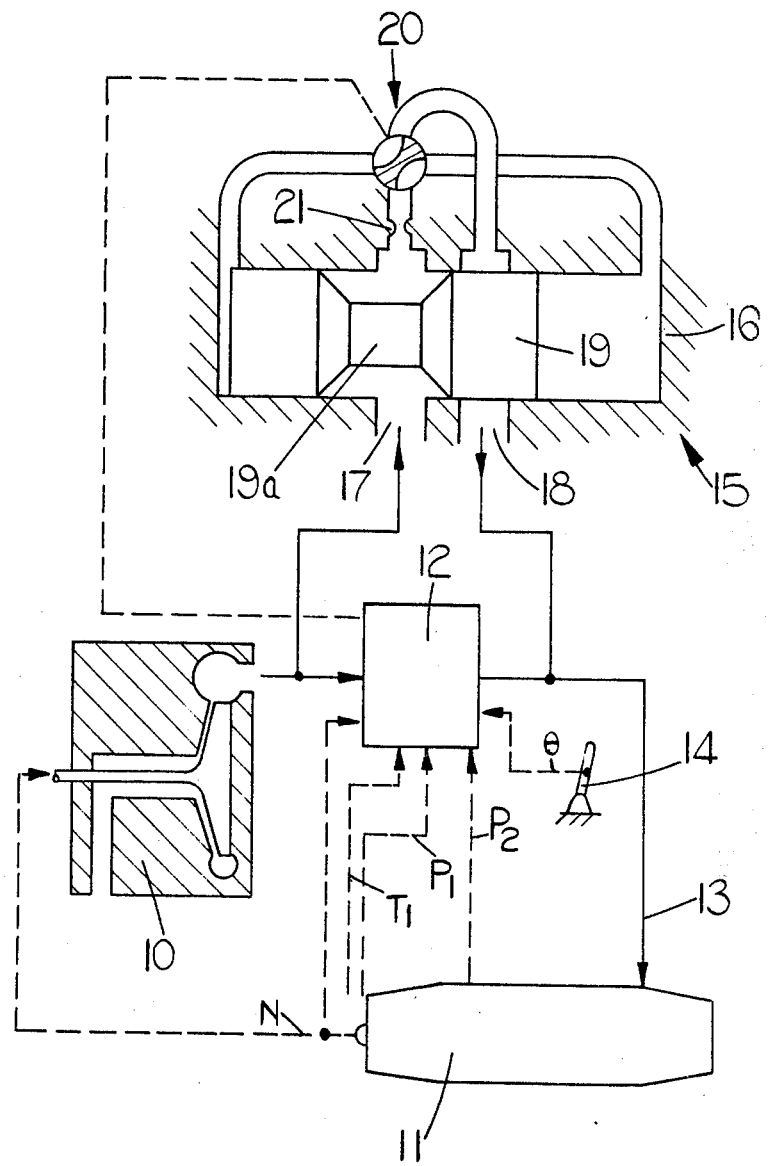

United States Patent [19]
Lewis

[11] 3,957,080
[45] May 18, 1976

[54] PRIMING VALVE FOR LIQUID FUEL SUPPLY SYSTEM

[75] Inventor: Geoffrey Arthur Lewis, Solihull, England

[73] Assignee: Lucas Aerospace Limited, Birmingham, England

[22] Filed: Aug. 29, 1974

[21] Appl. No.: 501,488

[30] Foreign Application Priority Data
Oct. 10, 1973   United Kingdom.............. 47286/73

[52] U.S. Cl................................. 137/599; 251/25; 60/243
[51] Int. Cl.²..................... F16K 19/00; F02K 3/06
[58] Field of Search ............... 251/324, 318, 14, 25, 251/12; 137/625.29, 625.34, 625.48, 599, 599.1, 624.11, 624.12; 60/243, 261

[56] References Cited
UNITED STATES PATENTS

| | | | |
|---|---|---|---|
| 528,933 | 11/1894 | Fowler................................. | 251/25 |
| 589,124 | 8/1897 | Evertsen.......................... | 251/25 X |
| 1,496,391 | 6/1924 | Thomas.............................. | 251/25 |
| 1,584,407 | 5/1926 | Thomas.............................. | 251/25 |
| 2,157,707 | 5/1939 | Keel................................... | 251/25 X |
| 2,587,539 | 2/1952 | Seaman.............................. | 251/25 X |
| 2,986,368 | 5/1961 | Moore .............................. | 251/25 X |
| 3,454,031 | 7/1969 | Kaptur............................. | 137/599 X |
| 3,454,046 | 7/1969 | Lanctot et al. ..................... | 137/599 |
| 3,527,255 | 9/1970 | Greenawalt..................... | 137/625.29 |

*Primary Examiner*—Martin P. Schwadron
*Assistant Examiner*—Robert J. Miller
*Attorney, Agent, or Firm*—Olson, Trexler, Wolters, Bushnell & Fosse

[57] ABSTRACT

A priming valve for a liquid fuel supply system is arranged in parallel with a fuel metering device and includes a shuttle control element which opens the priming valve during movement, the priming valve being shut at opposite ends of movement of the shuttle. The shuttle is moved by an operating pressure derived from the priming valve inlet via a restrictor and applied to respective ends of the shuttle by a change-over control valve which is operated to deliver a priming charge of fuel.

4 Claims, 3 Drawing Figures

PRIMING VALVE FOR LIQUID FUEL SUPPLY SYSTEM

This invention relates to priming valves for liquid fuel supply systems.

According to the invention the priming valve for a liquid fuel supply system comprises a housing, inlet and outlet ports in the housing, said ports respectively communicating, in use, with a source of pressurised liquid fuel and with an apparatus to which fuel is to be supplied, a control element movable within said housing between a first position in which said first port is shut and a second position in which said second port is shut, said ports being interconnected during movement of element between the two positions thereof, a control valve operable to apply an operating pressure to urge said element either towards said first position or said second position, and a flow restrictor through which fuel can flow from said inlet to provide said operating pressure.

Figure 2:
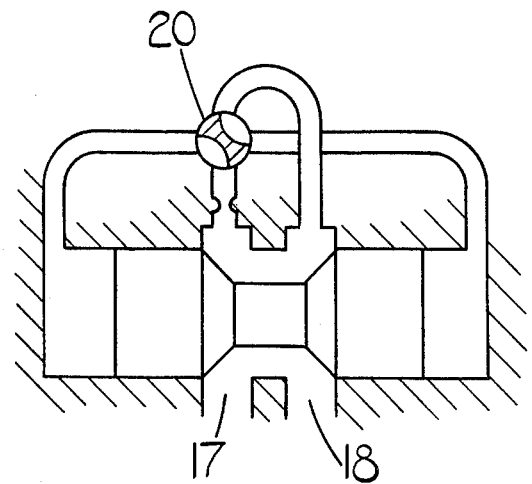
Figure 3:
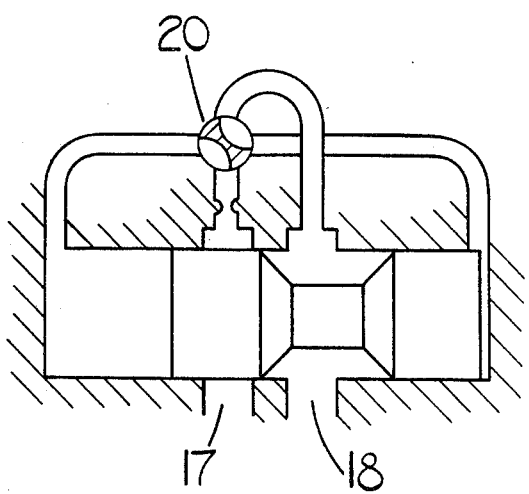

An example of the invention will now be described with reference to the accompanying drawings, in which:

FIG. 1 is a diagram of a fuel supply system for a gas turbine engine reheat arrangement, incorporating a priming valve according to the invention, and FIGS. 2 and 3 show alternative operating positions of the priming valve.

The system shown in FIG. 1 has a centrifugal pump 10 driven by the shaft of a gas turbine engine 11 and arranged to deliver fuel via a metering device 12 to a supply manifold 13 for reheat burners on the engine 11. The metering device 12 controls fuel flow to the manifold 13 in accordance with the engine speed N, engine compressor intake temperature and pressure $T_1$, $P_1$ respectively, compressor delivery pressure $P_2$, and the position $\Theta$ of a reheat selection control 14.

Connected in parallel with metering device 12 is a priming valve 15, having a housing 16 within which are an inlet port 17 and an outlet port 18 respectively connected to the pump outlet and to the manifold 13. A shuttle-type control element 19 is slidable within housing 16, between positions in which ports 17, 18 respectively are shut off. Element 19 has a portion 19a of reduced diameter which provides, in the mid-position of element 19, a flow passage between ports 17, 18.

A two-position control valve 20 is responsive to the metering device 12 to apply the pressure at port 17 selectively to the ends of element 16 to urge the latter in respective opposite directions. Valve 20 communicates with port 17 via a flow restrictor 21.

In use, valve 20 is operated during the starting cycle for the engine reheat arrangement, and it is arranged that priming takes place at a predetermined level of pump delivery pressure, in combination with the other engine operating parameters to which metering device 12 is responsive.

As shown in FIG. 1, the priming valve 15 is shut. FIG. 2 shows valve 15 during a priming operation, as a result of operation of valve 20, and FIG. 3 shows valve 15 after priming is complete. It will be understood that operation of valve 20 back to the position shown in FIG. 1 will also cause a priming operation.

When valve 20 is moved to the position shown in FIG. 2, fuel flows from port 17, via restrictor 21 and valve 20, to displace element 19 to the right. The time $t$ taken to effect this movement is given by:

$$t = K_1 \cdot V_1/a_1 \cdot \sqrt{dP} \qquad (1)$$

where $V_1$ = the volume displaced so as to flow through restrictor 21

$a_1$ = the flow area of restrictor 21

$dP$ = the pressure difference across ports 17, 18.

The volume $V_2$ flowing, in time $t$, between ports 17, 18 is given by:

$$V_2 = K_2 \cdot a_2 \cdot \sqrt{dP} \cdot V_1/a_1 \cdot \sqrt{dP} \qquad (2)$$

$$= K_2 \cdot a_2 \cdot V_1/a_1 \qquad (3)$$

The amount of fuel supplied during a priming operation is thus constant, and independent of the pressures at the various parts of the system.

I claim:

1. A priming valve arrangement for a liquid fuel supply system, said valve arrangement comprising a housing, a bore in said housing, inlet and outlet ports in the housing, said ports communicating with said bore, a control element slidable within said bore between first and second positions, in both of which said outlet port is isolated from said inlet port, said ports being interconnected during movement of said element between the two said positions thereof, said control element defining first and second chambers in said bore, one of said chambers communicating with said inlet port, whereby a fuel pressure in said inlet port provides an operating pressure in said one chamber to move said control element between its first and second positions, and a flow restrictor through which a fuel volume, whose displacement accompanies movement of said control element, is constrained to pass.

2. A valve arrangement as claimed in claim 1 which includes a control valve selectively operable to apply said operating pressure to said first or said second chamber.

3. A valve arrangement as claimed in claim 2 in which said shuttle has a portion of reduced cross-section intermediate its ends, said portion acting to interconnect said ports during movement of the shuttle.

4. A valve arrangement as claimed in claim 3 in which said portion is a portion of reduced diameter.

* * * * *